(12) United States Patent
Jordan et al.

(10) Patent No.: US 11,694,275 B2
(45) Date of Patent: Jul. 4, 2023

(54) DYNAMIC AUTOMATED INSURANCE APPLICATION ARCHITECTURE

(71) Applicant: Wave Insurance Technologies, Inc., Dallas, TX (US)

(72) Inventors: Gail Jordan, Dallas, TX (US); Keith Saving, Dallas, TX (US); Marc Still, Dallas, TX (US)

(73) Assignee: Wave Insurance Technologies, Inc., Dallas, TX (US)

( * ) Notice: Subject to any disclaimer, the term of this patent is extended or adjusted under 35 U.S.C. 154(b) by 1 day.

(21) Appl. No.: 17/559,603

(22) Filed: Dec. 22, 2021

(65) Prior Publication Data

US 2022/0198571 A1 Jun. 23, 2022

Related U.S. Application Data

(60) Provisional application No. 63/130,226, filed on Dec. 23, 2020.

(51) Int. Cl.
| | |
|---|---|
| *G06F 3/048* | (2013.01) |
| *G06Q 40/08* | (2012.01) |
| *G06F 40/103* | (2020.01) |
| *G06N 5/04* | (2023.01) |

(52) U.S. Cl.
CPC .......... *G06Q 40/08* (2013.01); *G06F 40/103* (2020.01); *G06N 5/04* (2013.01)

(58) Field of Classification Search
CPC ......... G06Q 40/08; G06F 40/103; G06N 5/04
See application file for complete search history.

(56) References Cited

U.S. PATENT DOCUMENTS

| | | | | |
|---|---|---|---|---|
| 8,543,425 | B1* | 9/2013 | Hacker | G06Q 40/08 705/35 |
| 9,280,252 | B1* | 3/2016 | Brandmaier | G06F 3/0482 |
| 10,460,392 | B1* | 10/2019 | Etheridge | G06Q 40/08 |
| 2004/0172310 | A1* | 9/2004 | Atlee | G06Q 40/08 705/4 |
| 2006/0173900 | A1* | 8/2006 | Dhayalan | G06Q 10/06 707/999.102 |
| 2006/0293928 | A1* | 12/2006 | Schumacher | G06Q 10/06375 705/4 |
| 2009/0164256 | A1* | 6/2009 | Fisher | G06Q 40/08 705/4 |
| 2009/0248481 | A1* | 10/2009 | Dick | G06Q 10/10 705/7.26 |
| 2012/0330686 | A1* | 12/2012 | Wirth | G06Q 40/08 705/4 |

(Continued)

*Primary Examiner* — Rashawn N Tillery
(74) *Attorney, Agent, or Firm* — Sughrue Mion, PLLC

(57) ABSTRACT

An apparatus for generating an application document is provided. The apparatus retrieves a plurality of candidate questions from at least one database, each of the plurality of candidate questions corresponding to one of a plurality of entities, and each of the plurality of entities being different from each other, removes substantively similar candidate questions among the plurality of candidate questions from the different entities; and generates a graphical user interface by aggregating remaining candidate questions among the plurality of candidate questions after the removal of the substantively similar candidate questions as application questions.

9 Claims, 19 Drawing Sheets

(56) References Cited

U.S. PATENT DOCUMENTS

| | | | |
|---|---|---|---|
| 2014/0195412 A1* | 7/2014 | Metz | G06Q 40/03 705/38 |
| 2014/0372150 A1* | 12/2014 | Karie | G06Q 30/0631 705/4 |
| 2020/0058073 A1* | 2/2020 | Diedrich | G06Q 10/087 |
| 2021/0151195 A1* | 5/2021 | Hayward | G06Q 50/163 |
| 2022/0164549 A1* | 5/2022 | Gupta | G06F 40/56 |
| 2022/0300306 A1* | 9/2022 | Leung | G06F 9/453 |
| 2023/0032043 A1* | 2/2023 | Wilkes | G06Q 10/10 |

* cited by examiner

FIG. 1D

Redundant Information

- A large percentage of questions that appear on different applications are "similar" in nature
- Agents and clients alike are frustrated with the amount of redundant entry in the new business submission process
- Agencies find it challenging to attract new talent due to the lack of automation in the Independent Insurance Industry

FIG. 1E

- Overall "Business" knowledge
- Underwriting exposures
- Terminology & definitions
- Agents must also possess "industry and classification knowledge" of the industry in which their clients operate
- Carrier processes
- Carrier underwriting guidelines
- Carrier market appetite
- Differences in Policy Form
- Products
- Coverages
- Who's who in the industry
- Insurance terminology
- Agents must possess "insurance knowledge"
- Tribal knowledge in the insurance industry is comprised not only of "insurance" knowledge Industry Knowledge

DYNAMIC AUTOMATED INSURANCE APPLICATION ARCHITECTURE

BACKGROUND

1. Field

Embodiments of the disclosure relate to a system for aggregating insurance questions, answers, underwriting requirements, workflows, documents, and data from various insurance carriers operating across numerous industries, including without limitation *cannabis*, transportation, senior living, manufacturing, non-profit, technology, construction and many more. Embodiments of the disclosure also relate to a portal and a user interface for assisting insurance professionals in searching for insurance offered by the insurance markets operating across multiple industries according to client needs, and to generate documentation necessary for submitting requests for, and receipt of, insurance products and services offered by the insurance carriers, including without limitation all varieties of insurance.

2. Description of Related Art

FIGS. 1A-F illustrate a conventional process of an insurance application process.

Referring to FIGS. 1A-F, insurance professionals face many challenges within the insurance industry to obtain new sales opportunities and leverage those opportunities across all varieties of insurance products.

Referring to FIGS. 1A-B, conventionally, an agent or other insurance professional might begin by identifying potential insurance markets. In each market, there may be any number of available insurance carriers. The number of insurance carriers may vary by state, by product line, by industry, and by classification within each industry. Accordingly, experienced insurance agents may possess esoteric or tribal knowledge of the various insurance markets within each regional geography. These experienced agents may be leveraged by insurance agencies to identify available insurance markets according to customers' needs. Alternatively, a detailed research and review of the insurance spectrum may be necessary to determine the potential markets. For insurance agencies that do not possess such pre-existing knowledge and experience, identifying potential insurance markets may be difficult. Moreover, even if an insurance agency does employ staff possessing the requisite knowledge of the insurance marketplace, meaningful inquiry may still be required to determine whether such pre-existing knowledge base of potential markets is current, whether the breadth of the pre-existing knowledge base encompasses new markets, and whether agents are writing insurance policies within different classifications.

Accordingly, insurance agency principals may encounter problems in the case that agents and other insurance professionals conduct business in ways that are not in accord with the interests of the insurance agency and in the case that agents and other insurance professionals habitually investigate only markets with which they are familiar, whether due to ignorance or because of the significant effort required to successfully penetrate new markets. Such difficulties may be present for insurance prospects as well. If an insurance agent is not accessing the market that can possibly place the agency principal in a more advantageous position, then a primary function of the agency may be failing and, more troublesome, the agency principle may be unaware of such shortcomings.

If the insurance professionals are required to manually research potential markets, they may either navigate to an insurance carrier website and access the insurance carrier documents necessary for submitting a request for, or receipt of, insurance products or services, one by one, or the insurance professional may telephone an insurance underwriter and verbally request the information, such as a market availability document. However, if the insurance carrier underwriter possesses a market availability document, the static nature of the market availability document may present uncertainties for the insurance professional as to whether the market availability document is accurate and updated with respect to changing legal and regulatory requirements. These uncertainties may be exacerbated owing to the manpower and technological recourses necessary on the part of the insurance carrier to create and maintain the most current market availability documents.

In an example of insurance in the *cannabis* industry, a market availability document may include correlations between industry specialization within the *cannabis* industry, different categories and product lines relating to *cannabis*, and professional liability. However, the market availability document may not associate or correlate by classification of business, for example in the *cannabis* arena whether by dispensary, by laboratory, by manufacturer, or by delivery operation.

With or without a market availability document, an insurance professional may be required to determine the product lines available for each industry and classification for each insurance carrier. Again, an insurance professional must either possess such institutional knowledge or expend time and resources to research the available products suitable for the insurance policies and services offered by the insurance carrier.

Referring to FIGS. 1C-D, subsequently, application submission by the insurance professional on behalf of the insurance purchaser and processing by the insurance carrier must occur. The insurance application may be required to be submitted by paper or electronically. Alternatively, an online portal operated by the insurance carrier may exist to receive insurance submission documentation. Unfortunately, due to industry fragmentation, both physical submission of documentation and electronic submission of documentation may be required for certain carriers.

Each insurance market may also require different applications, or different applications based on the number of product lines offered in the market. Therefore, when searching for coverage within the *cannabis* industry, which for each of various applications must be identified by the insurance professional for each carrier in each state for each product line. Applications could also vary by industry and classification within each industry. As a result, multiple insurance applications may be required, which may entail completing various forms, submission by various systems, and interfacing with various parties. The insurance professional may identify which carriers offer an online portal, which may be few, and advantageously an independent insurance agent may be quoting with multiple insurance carriers on behalf of a customer. Therefore, even if insurance carriers offer an online quoting portal, the insurance professional may still be required to input information into multiple portals in addition to completing multiple manual applications, which entail completion of questionnaires, and which may include the same questions, different questions, or similar questions obligated by internal guidelines, or federal, state, or local regulatory guidelines. Consequently, the diversity of application processes may be confusing and time consuming, and may necessitate excessive interactions between the insurance agent and the insurance client, as well as between the insurance agent and the insurance carrier or wholesaler. Such increasingly high interactions may reduce close ratios and increase client acquisition costs.

As shown in FIG. 1E, an independent insurance professional or agent is charged with having industry knowledge, whether its definitions, the knowledge about policy forms, underwriting guidelines, the underwriting process, and the submission process details. Additionally, successful independent insurance agents must attain a high level of industry knowledge suitable for representation as industry experts of the accounts currently being serviced. As a result, knowledge as to advising insurance purchasers whether to purchase certain insurance products and services, an insurance agent must also be a relative expert in the industry in which their prospect/client operates and possess business knowledge within the commercial space, which requires extensive training and experience.

Referring to FIG. 1F, once a new insurance submission is complete, an insurance professional should track the status of a response from the insurance carrier, and may or may not utilize a sales system to track sales opportunities. Even when the sale systems are utilized, manual entry into such systems is not uncommon. Thus, there may be a risk of lack of responsiveness to customers without high diligence on the part of the insurance agent and insurance agency.

Further, insurance professionals may lack sophisticated integrated sales cycle automation options, possess limited information regarding close ratios, and may be restricted to limited information regarding the length of time in each category of the sales pipeline, and the potential premium in the sales funnel for the sales opportunity. Such information could give the agency principal insight into how much written premium is available to be closed at the end of the month, at the end of a quarter, or at the end of the annual sales cycle, and geographic or product markets the insurance agency is winning or losing. For example, sales cycle automation could provide the ability to track touchpoints and notations between multiple parties in the sales cycle, including sales tracking and communication logging between referral partners, insurance agents, wholesalers and/or insurance carriers, thereby enabling true management of a sales opportunity from start to finish with a full history and dialogue between each party.

Accordingly, an aggregated system and portal would streamline agent application and submission requirements.

SUMMARY

Embodiments relate to a system, interface, and portal for assisting insurance agencies to aggregate and reduce redundant information necessary for an agency to gather and complete an online submission and reduce the need for manual applications.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1A-F illustrate a conventional process of an insurance application process;

DETAILED DESCRIPTION

Figure 1A:
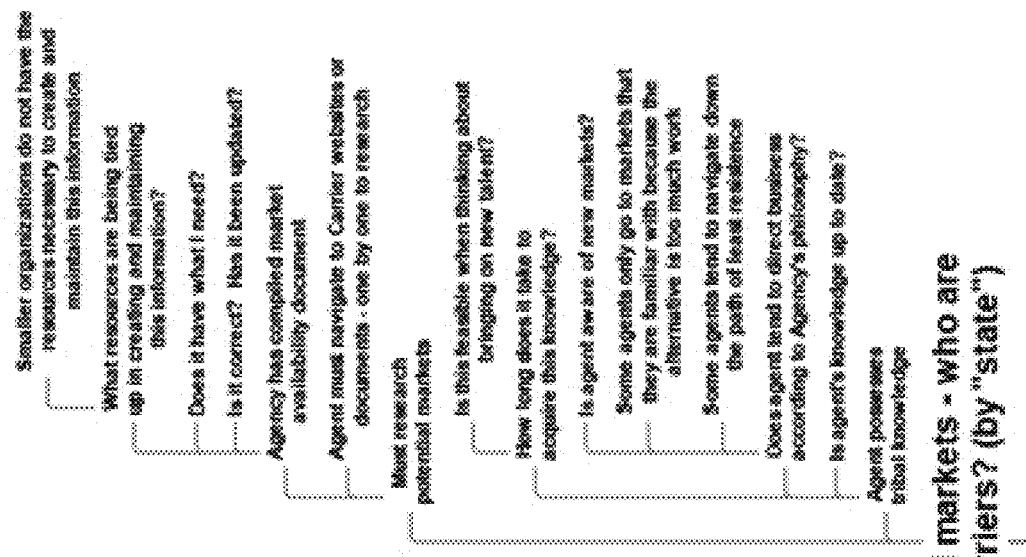
Figure 1B:
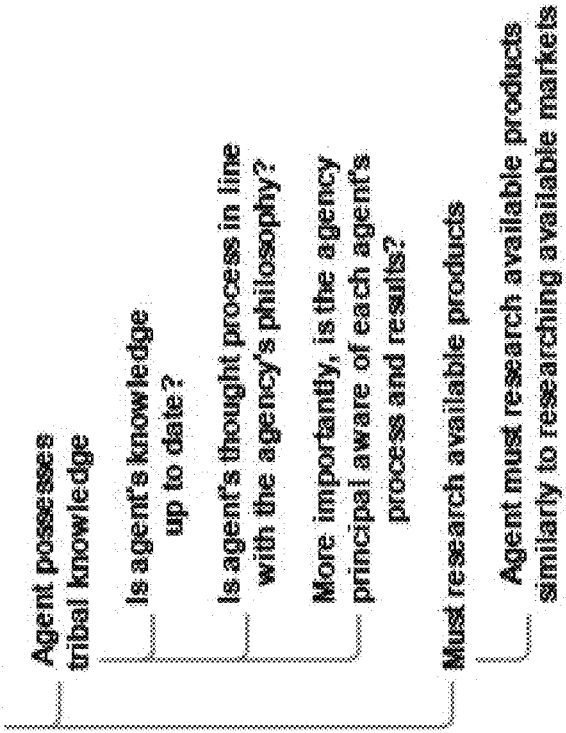
Figure 1C:
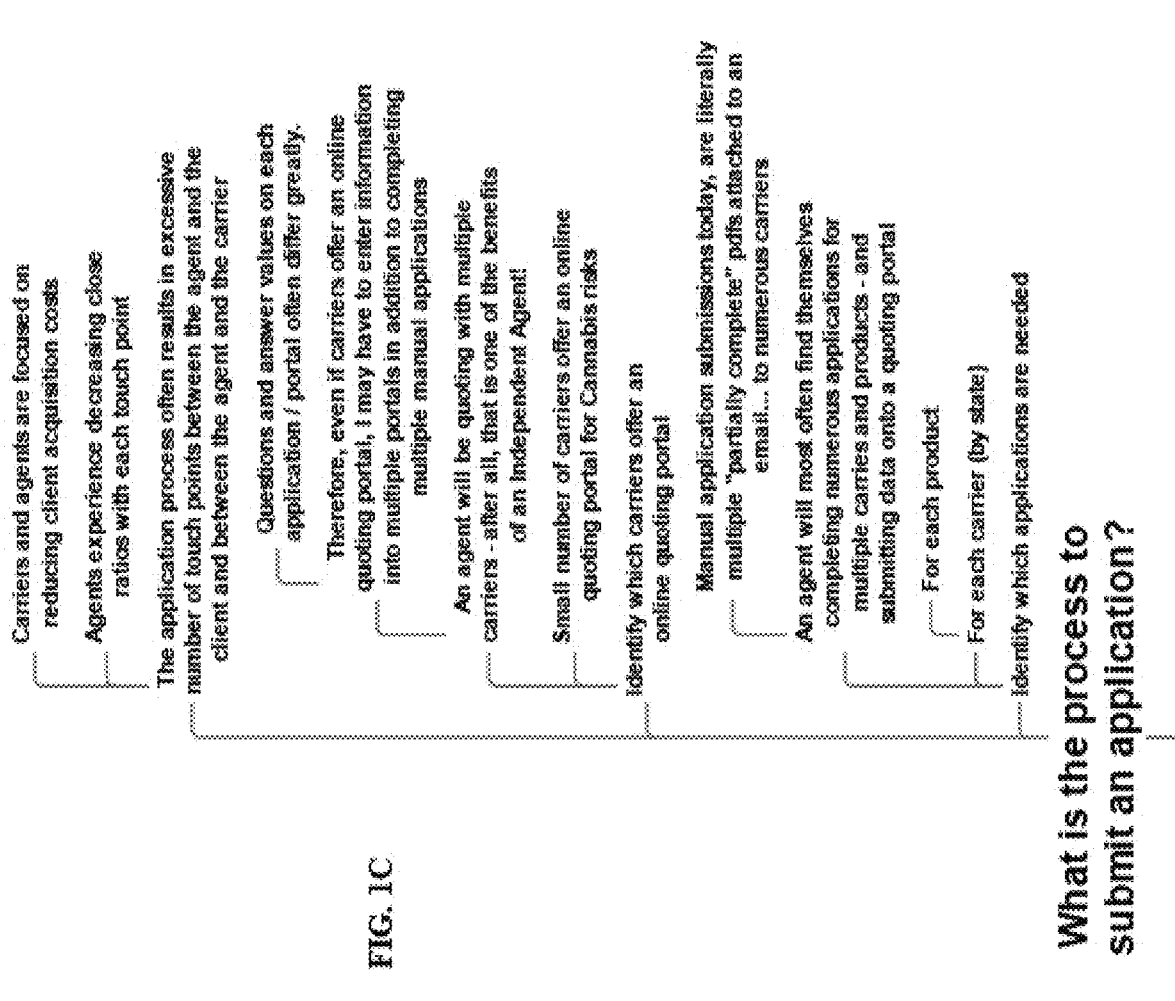
Figure 1F:
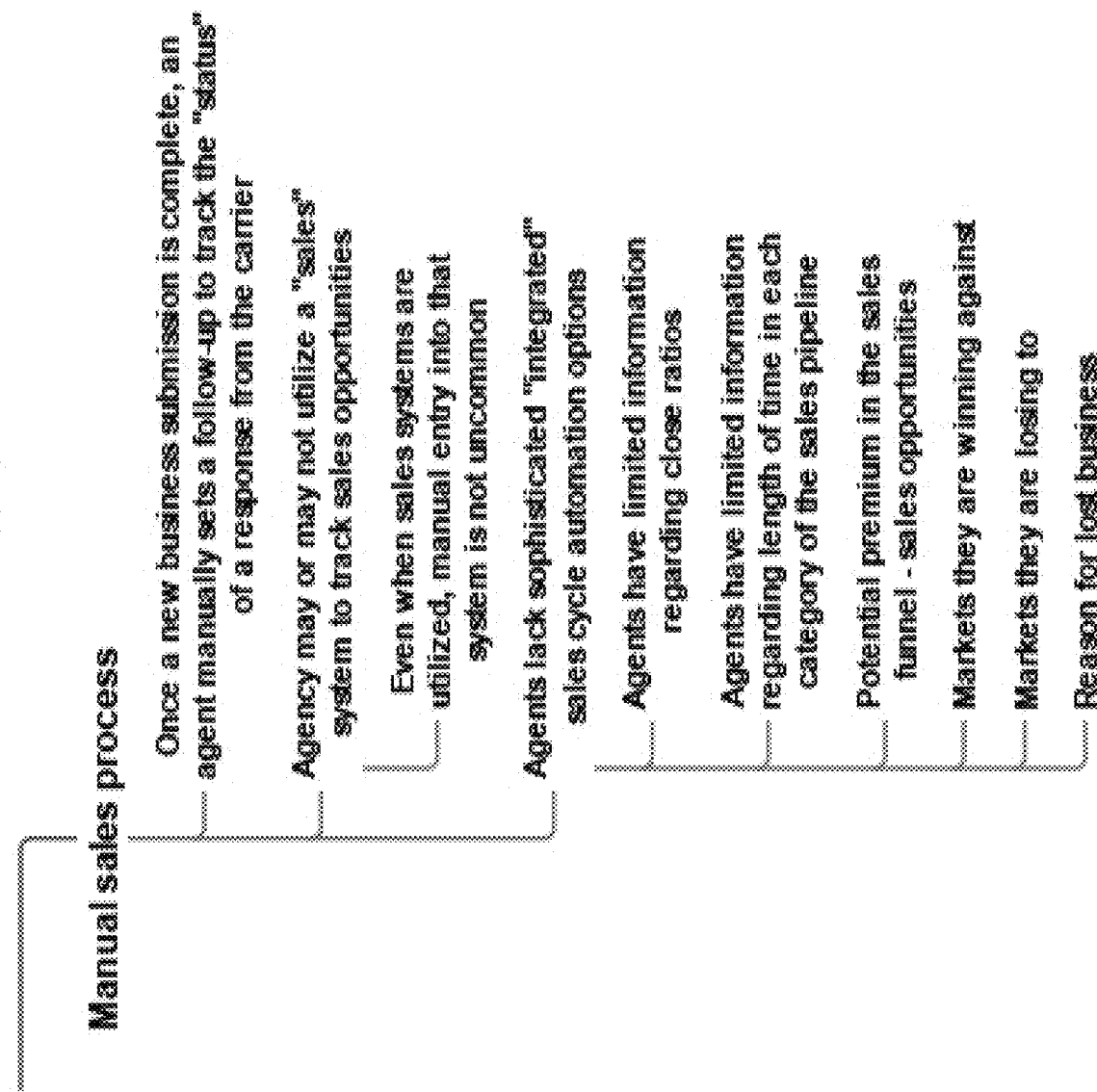

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of the embodiments, certain detailed explanations of related art are omitted when such explanations might unnecessarily obscure the essence of the disclosure.

In the disclosure, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

The insurance interview designer enables an insurance subject matter expert to construct insurance interviews conducted between a less-sophisticated insurance agent and an insurance customer. The insurance interview may be designed based upon the target sales department, for example, personal lines, commercial lines, life insurance, benefits, etc., taking into consideration each industry and classification within that industry, when applicable. The insurance interview may be constructed through the insurance interview designer in a codeless environment using system components available to the insurance subject matter expert.

Figure 2:
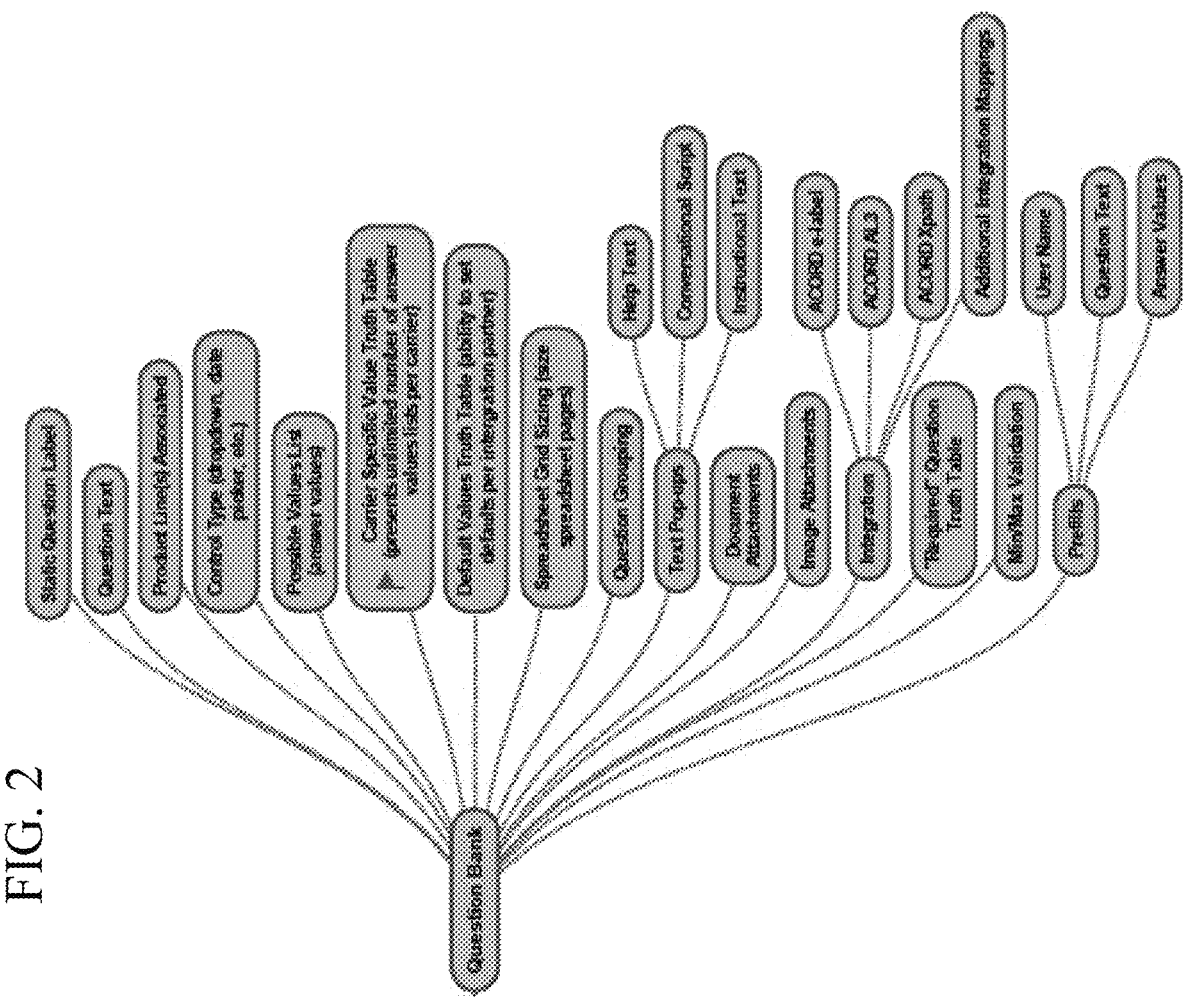
FIG. 2 illustrates question bank functionality of the insurance interview designer according to an embodiment.

FIG. 2 illustrates a question bank of the insurance interview designer according to an embodiment.

Figure 3:
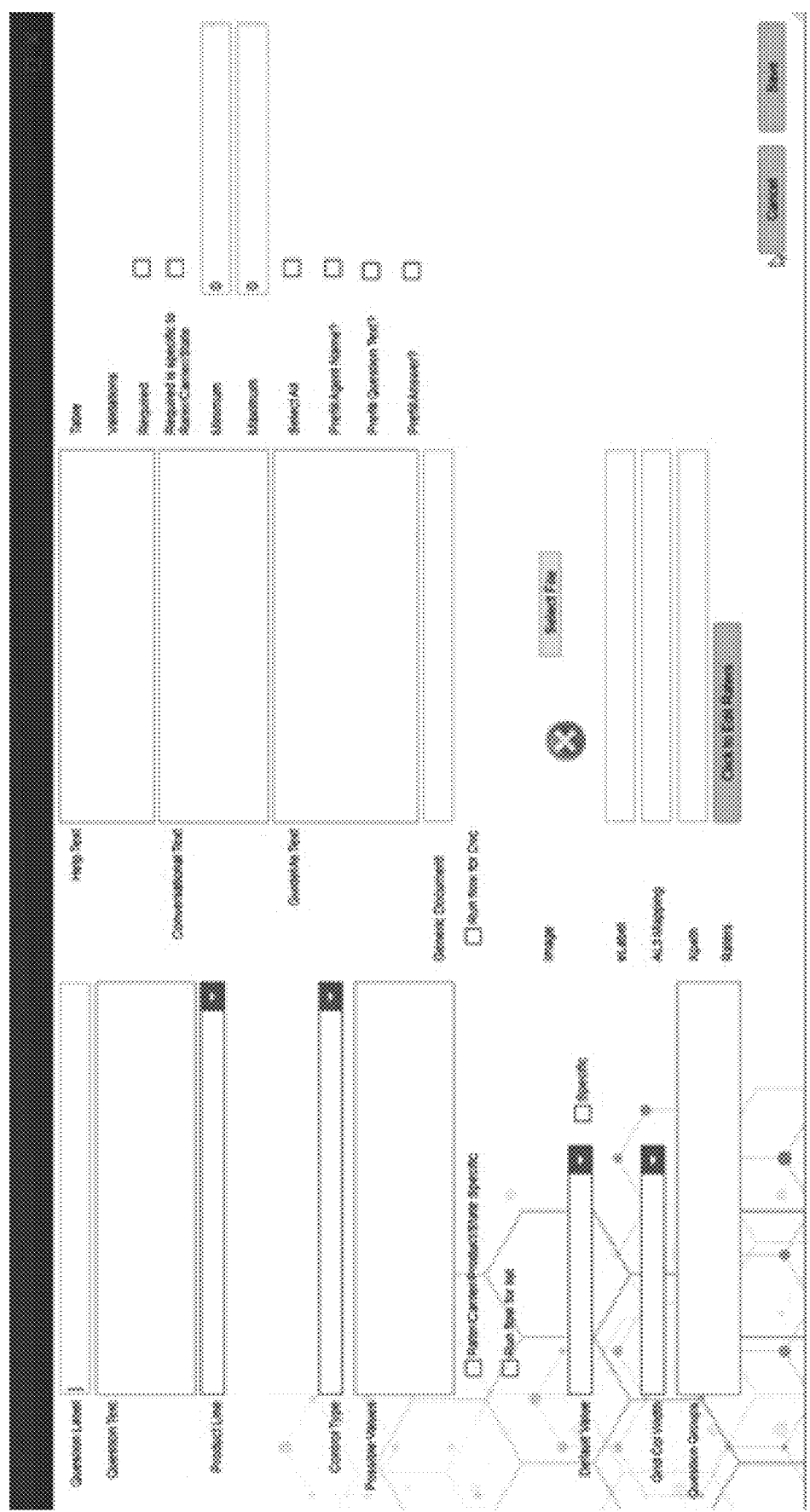
FIGS. 3 and 4 illustrate a user interface of the insurance interview designer that enables an insurance subject matter expert to create insurance interview questions.

Referring to FIG. 3, the insurance interview designer may include a question bank module or question builder module, which enables the insurance subject matter expert to create insurance interview questions. These insurance interview questions may be posited by the insurance sales agent to the insurance purchaser (customer). Additionally, insurance agencies may configure specific questions to be presented to insurance agents within their particular agency, and other agency specific information including introductory scripts, sales scripts, terminology and definitions by industry and business, and closing scripts for overcoming insurance application objections and closing the sale.

The question bank module or question builder module may be implemented to include a question database stored on a server accessible to the insurance subject matter expert and the insurance sales agent via a portal.

Figure 4:
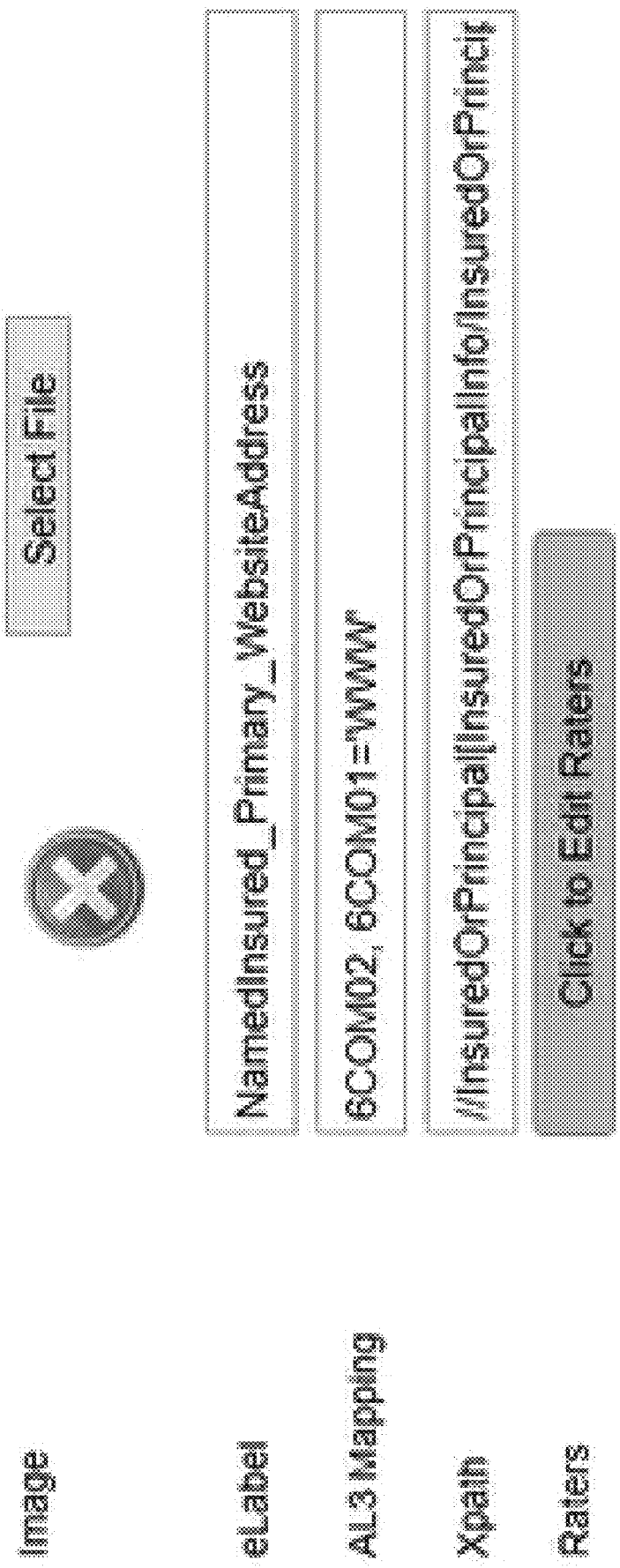

FIGS. 3 and 4 illustrate a user interface of the insurance interview designer that enables an insurance subject matter expert to create insurance interview questions.

Referring to FIGS. 2 and 3, operations of the question bank module or question builder module may include the ability to assign a static question label to a question, assign question text associated with each question, associate each question with a product line, select a control type for answering each question (e.g., dropdown box, date selector, radio button, etc.), and assign possible values associated with each question.

The static question label may be a label representative of the insurance interview question assigned by the insurance subject matter expert through the entry field illustrated in the user interface of the insurance interview designer illustrated in FIG. 3. The static question label may be stored in a record of a question label table stored in the question database. The static question label may be, for example, assigned as a primary key for accessing the question via the question database.

The question text may be text assigned by the insurance subject matter expert through the question text field illustrated in the user interface of the insurance interview designer illustrated in FIG. 3. The question text may be stored in a record of a question text table stored in the question database.

The product line may be a type of product or products associated with the question assigned by the insurance subject matter expert. The product line(s) may be selected by the insurance subject matter expert through the product line drop down box illustrated in the user interface of the insurance interview designer illustrated in FIG. 3. The product line drop down box may be associated with various options for the product type, which may be stored in the question database. The product line of the question may be stored in a record of a product line table stored in the question database.

The control type may be a type of control associated with the question assigned by the insurance subject matter expert. The control type may be any one of a dropdown box, a date selector, a radio button, etc., that may be displayed on a page of the insurance interview. The control type may be selected by the insurance subject matter expert through the drop down box illustrated in the user interface of the insurance interview designer illustrated in FIG. 3. The control type may be associated with various operations for the control type, which may be stored in the question database. The control type of the question may be stored in a record of a control type table stored in the question database.

The possible values may be one or more possible values associated with answers to the question. The possible values may be input by the insurance subject matter expert through the possible values field illustrated in the user interface of the insurance interview designer illustrated in FIG. 3. The possible values may be stored in records of a possible values table stored in the question database.

The question bank module or question builder module may also include the functionality to display answer lists for each question per carrier. Accordingly, when respective carriers build out their automation systems, each carrier may employ unique questions and unique answer formats to each question. Thereby, all answer values of the respective carriers may be presented in a unified manner.

The question bank module or question builder module may assign a default values truth table to each question, to present default values based upon integration partners. Accordingly, answers from multiple insurance carriers may be obtained and aggregated, and appropriate to answers may be assigned by the insurance subject matter expert for selection by insurance agent. Thereby, suitable answers to insurance carrier questions may be provided in the insurance application process designed by the insurance interview designer.

The question bank module or question builder module may provide to the insurance agent a spreadsheet designed by the insurance subject matter expert. The spreadsheet may be configurable within the interview designer to present a spreadsheet embedded within a page of the insurance interview that can be resized and controlled by the insurance agent for input of information related to the insurance question.

The question bank module or question builder module may be configured to group questions together into a single question or under a single question label. Thereby, substantively similar but differently phrased insurance carrier questions may be consolidated into a single question.

The question bank module or question builder module may provide textual recommendations to the insurance agent in the form of text pop ups, to assist the agent in obtaining all of the knowledge necessary around the business and the insurance industry in each of the industries in which the agent is underwriting. For example, help text or instructional text may be presented to an agent. The help text or the instructional text may be entered by the insurance subject matter expert in the various text fields illustrated in the user interface of the insurance interview designer illustrated in FIG. 3.

The question bank module or question builder module may associate a number of different type of documents with each question. The documents associated with the question may be selected by the insurance subject matter expert. The documents, or links or hyperlinks to the documents, associated with the question may be displayed on a page of the insurance interview designed by the insurance interview designer. Multiple versions of each document are supported and can be presented based upon the effective date of the document and the effective date of each interview.

The question bank module or question builder module may associate images that are related to each question. The images associated with the question may be selected by the insurance subject matter expert using the file selection button in the user interface of the insurance interview designer illustrated in FIG. 3.

Moreover, the question bank module or question builder module may be configured to assign mappings for each of multiple different integration partners that integrate with the insurance interview designer. For example, ACORD mappings may be implemented and assigned by the insurance subject matter expert using the mappings fields illustrated in the user interface of the insurance interview designer illustrated in FIGS. 3 and 4. The mappings may be stored in records of a mappings table stored in the question database.

The question bank module or question builder module may be configured to associate whether a question is required to be answered, based on an integration partner using a truth table. The requirement of a question to be answered by an insurance agent may be set via the check box illustrated in the user interface of the insurance interview designer illustrated in FIG. 3.

The question bank module or question builder may be configured to assign minimum validations or maximum validations for each question control type. The minimum validations or maximum validations for each question may be set via the minimum and maximum field values illustrated in the user interface of the insurance interview designer illustrated in FIG. 3. The minimum validations or maximum validations may be stored in records of one or more validations table stored in the question database.

The question bank module or question builder module may be accessed to pre-fill values across multiple different insurance interview pages displayed to an insurance agent. For example, a username may be automatically inserted into a username text field. Similarly, answers to questions that have been previously completed may be populated across subsequent fields of pages of the insurance interview. Additionally, similar answers to questions previously provided may be pre-filled with commensurate answers, when multiple product lines having similar question and answer values are pursued. Accordingly, redundancy of the insurance agent or insurance purchaser in completing application processes may be eliminated.

Data that has been obtained through the interview process may be integrated into agency management systems utilizing industry standards and propriety technology. For example, a username, mailing address, insured property address, etc. may be stored by an agency management system and may be automatically inserted into a username text field, a mailing address field, an insured property address field, etc. Such data may be altered within the agency management system, and the updated data can be electronically submitted back into interview. Alternatively, information obtained through the interview process may be uploaded into the agency management systems, thereby updating the data within the agency management systems. Accordingly, data flows bi-directionally between the agency management systems and the interview designer architecture.

The pre-filled values may be generated from optical character recognition (OCR) of document provided by insurance carriers or utilization of RPA to capture and map data from a document, website or outside source to prefill answers in the insurance interview. Documents accessible for pre-filled fields may include declaration pages, loss runs, CLUE reports for property and automobiles, motor vehicle reports, insurance proposals, and drivers licenses. Other sources of data may include carrier applications, carrier forms, carrier market appetite documents, carrier workflows, carrier eligibility guidelines, carrier product documentation, and carrier contact details. Moreover, the system may leverage robotic process automation (RPA) and artificial intelligence (AI) to accumulate, analyze, and format into questions and answers for streamlining the insurance application process. For example, robotic process automation (RPA) may be utilized to crawl documentation and resources available from carrier websites over the Internet or available in various publically available databases or data stores. Information may be accumulated and aggregated into one or more datasets. Moreover, AI and RPA could be leveraged for automated test cases. Using artificial intelligence (AI), the aggregated data may be analyzed to determine commonalities and differences between insurance product requirements and documentation. Such commonalities and differences may be leveraged to fully or partially generate questions and representative answers, which may be monitored, approved, edited, and otherwise managed by subject matter experts.

The question bank or question builder may include questions related to any type of insurance or insurance product. In an embodiment, the questions may relate to catastrophe data by geographical location, which might be relevant to the insurance application process. Types of catastrophe data may include historical data by geographic location with respect to earthquakes, flooding, hail, tornadoes, hurricanes, fires, pandemics, etc. Accordingly, when an address of with the prospective purchaser is associated with a geographic area subject to catastrophe, the question bank or question builder may include a series of questions related to such catastrophe. For example, once an address is compared to the territories that have been affected by a catastrophe, and if the address is within an affected area based on historical data, the user will be notified that the property is within the affected area. Then a question may be revised algorithmically and a question asked if the property has been inspected for damage, or if damage has occurred in the past, and whether the damage has been repaired.

In the case of catastrophe data associated with a geographic area in which a prospective insured address is located, insurance carriers may issue moratoriums on new business within the affected areas. Based on the answers to questions regarding catastrophes, a user may be notified of current restrictions. For example, an agent may be notified by email, a banner on the insurance website, or by notification within the interview system if a moratorium on certain insurance is in effect.

Figure 5:
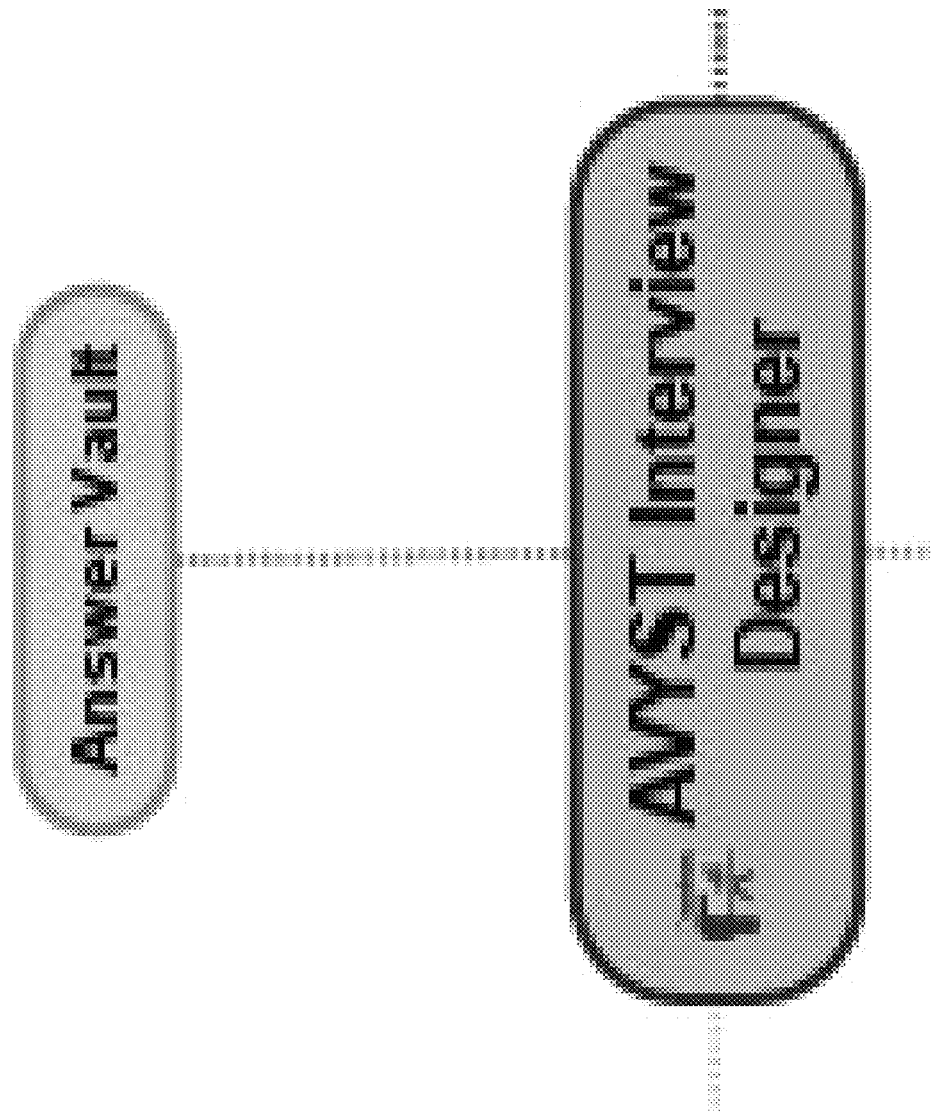
FIG. 5 illustrates an answer vault of the insurance interview designer according to an embodiment.

FIG. 5 illustrates an answer vault of the insurance interview designer according to an embodiment.

The answer vault module may be implemented to include an answer database stored on a server accessible to the insurance subject matter expert and the insurance sales agent via a portal.

The answer vault may include a store of answers that may be provided to insurance agents to assist in completing the insurance application. The answers stored in the answer vault may be integrated with the answers associated with the questions of the question bank module such that possible answers associated with questions may be displayed on pages of the insurance interview.

Insurance carriers frequently present differing answers to select from for like questions. Accordingly, the interview designer system algorithmically determines when carriers possess differing answer lists. Users may be notified of the differing answer lists, and may be presented with answer lists by carrier from which to select. This customization of the insurance interview allows for "exact" translation to paper applications or electronic transmissions, per carrier, whereas conventional systems omitting such functionality may result in potentially incorrect answers being recorded, thus altering coverage and/or eligibility determinations.

Figure 6:
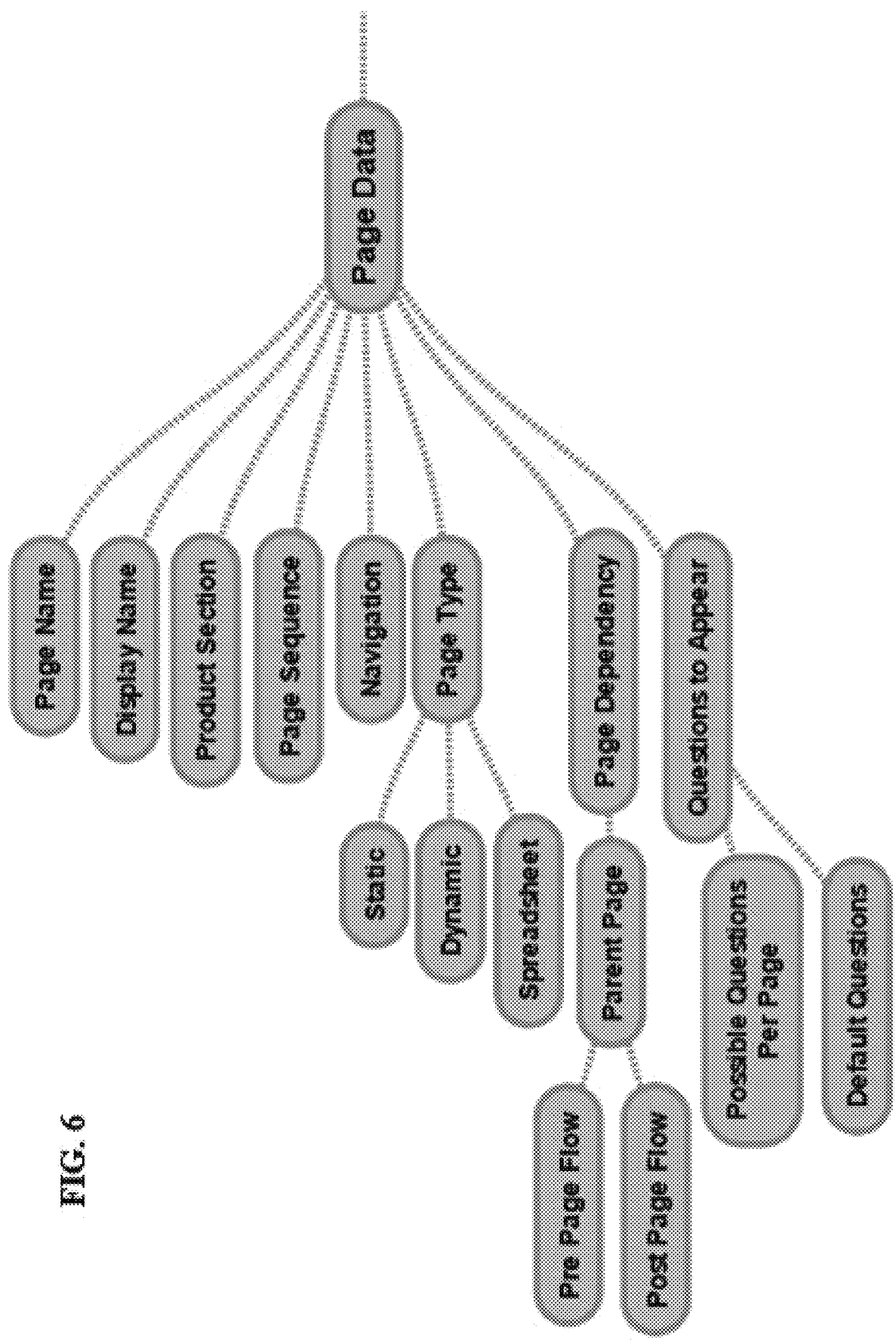
FIG. 6 illustrates a page data module of the insurance interview designer according to an embodiment.
Figure 7:
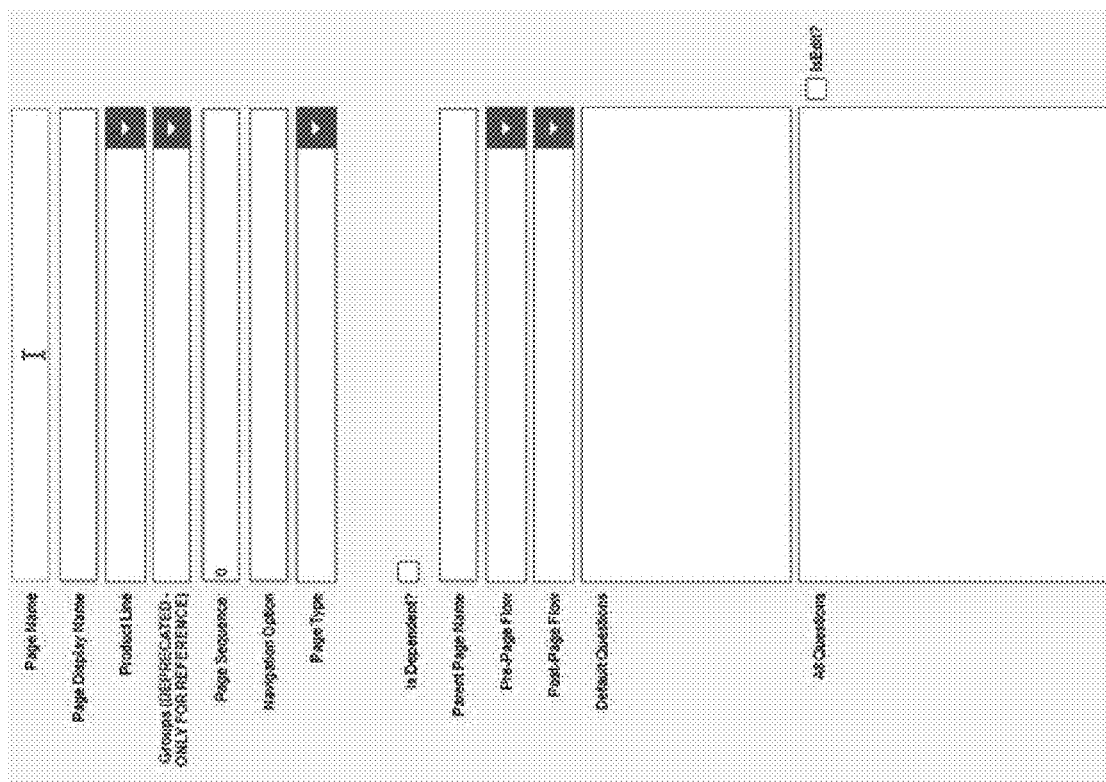
FIG. 7 illustrates a user inter interface of the insurance interview designer that enables an insurance subject matter expert to create pages of the insurance interview.

FIG. 6 illustrates a page data module of the insurance interview designer according to an embodiment. FIG. 7 illustrates a user inter interface of the insurance interview designer that enables an insurance subject matter expert to create pages of the insurance interview.

The interview designer may include a page data module, which is configured to enable creation of an interview page by the insurance subject matter expert. The page data module may be configured to assign a page name to a page of the insurance interview, a displayed name of the page of the insurance interview that is different from the page name, a product associated with the page of the insurance interview, or a product line associated with the page of the insurance interview.

The page data module may be implemented to include a page database stored on a server accessible to the insurance subject matter expert and the insurance sales agent via a portal.

The page name may be a label representative of the page of the insurance interview assigned by the insurance subject matter expert through the entry field illustrated in the user interface of the insurance interview designer illustrated in FIG. 7. The page label may be stored in a record of a page label table stored in the page database. The page name may be, for example, assigned as a primary key for accessing the page via the page database.

The page display name may be a name of the page of the insurance interview that is displayed to the insurance agent accessing the insurance interview via the portal. The page display name may be assigned to the page of the insurance interview by the insurance subject matter exert via the page display name field illustrated in the user interface of the insurance interview designer illustrated in FIG. 7. The page display name may be stored in a record of a page display name table stored in the page database.

The product line may be a type of product associated with the page of the insurance interview designed by the insurance subject matter expert. The product line may be selected by the insurance subject matter expert through the product line drop down box illustrated in the user interface of the insurance interview designer illustrated in FIG. 7. The product line drop down box may be associated with various options for the product type, which may be stored in the question database. The product line of the page may be stored in a record of a product line table stored in the page database.

The page sequence may be a sequence of the page of the insurance interview designed by the insurance subject matter expert. The page sequence may be assigned by the insurance subject matter expert through the page sequence field illustrated in the user interface of the insurance interview designer illustrated in FIG. 7. The page sequence of the page may be stored in a record of a page sequence table stored in the page database.

The page type may be a type of the page of the insurance interview assigned by the insurance subject matter expert. The page type may be any one of dynamic, static or spreadsheet. The page type may be selected by the insurance subject matter expert through the drop down box illustrated in the user interface of the insurance interview designer illustrated in FIG. 7. The page type of the page of the insurance interview may be stored in a record of a page type table stored in the page database.

Using the page data, each page the insurance interview may be sequenced according to the page sequence identifier. Accordingly, the insurance interview designer may be configured by the insurance subject matter expert to provide navigation flows of the insurance interview in an appropriate order.

Within the insurance interview designer, the page data may be leveraged using a navigation tool. The navigation tool may include navigation functionality between different insurance interview pages, such that different types of pages that can be created. The types of pages may include static pages that are manually created, for example using a form builder. The types of pages may also include a dynamic page that may be dynamically created by accessing the question bank and answer vault. Additionally, spreadsheet views may be embedded in each interview page, for example by accessing spreadsheet controls of the question builder, and thus page dependencies may be determined and utilized to provide appropriate page sequencing and navigation. Accordingly, if a question is answered in a specific manner, one or more pages can be dynamically inserted within the interview based on an answer to a preceding question on a page.

The page data may further include a set of question labels that could be possibly displayed on one or more interview pages. The question labels may be assigned and selected based on page dependency rules, and the question labels may always be provided for default questions that are always displayed on standardized interview question pages.

The underwriting results created via a rules engine may be displayed on a panel within the interview pages, for example a panel anchored to a right side of the interview interface. For example, the underwriting results may be provided by carrier, including the carrier name. The carrier name may be displayed according to a color coding scheme, indicating whether to accept (e.g., green), refer (e.g., yellow), and decline (e.g., red). The carrier name may be associated with a carrier logo, which also appears in the panel associated with the carrier, and a hyperlink to the carrier website. Other user interface elements may be included in the panel, including icons to accept, refer, or decline insurance product offered by each carrier. Within each result, the panel and interview interface may provide a list of questions and answers for each of the underwriting results, so that an insurance agent may view a report of the questions and answers that affected a determination of whether to accept, refer, or decline an insurance product offered by the insurance carrier. Similarly, the insurance agent may also access carrier documents and a carrier contact list associated with the particular results of each carrier.

The insurance interview may graphically present a coverage cart icon representing a selection of insurance products or policies. As product lines are selected based on the results of the insurance interview, the coverage cart icon may appear in the upper right corner of the interview user interface (similar to the shopping cart on shopping websites). The number of insurance products selected may be provided in the coverage cart. Upon accessing on the coverage cart through the coverage cart icon, data of the insurance products lines and associated coverages and deductibles may be displayed.

The page data may also include graphical elements selectable by a user to create a proposal for the prospective purchaser. Through selection of the graphical element, an insurance agent may be provided with a side by side comparison of one or more carriers providing the insurance coverage.

Figure 8:
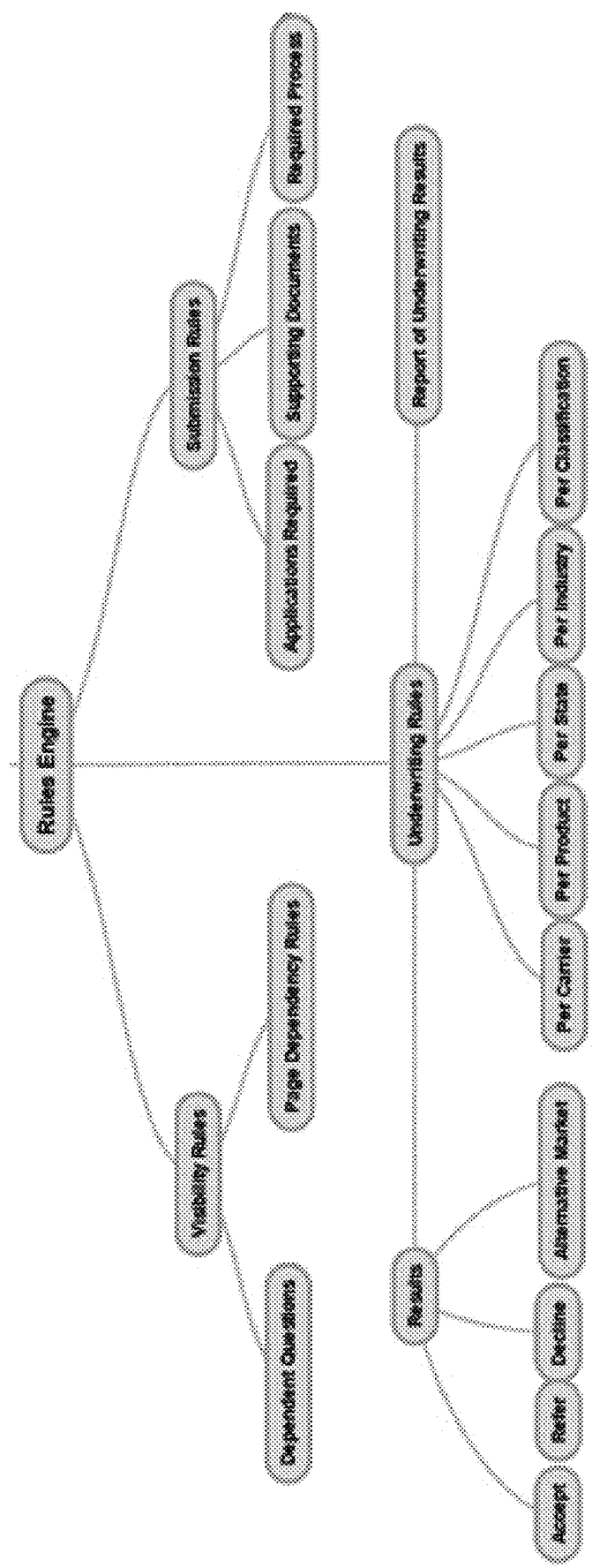
FIG. 8 illustrates a rules engine of the insurance interview designer according to an embodiment.
Figure 9:
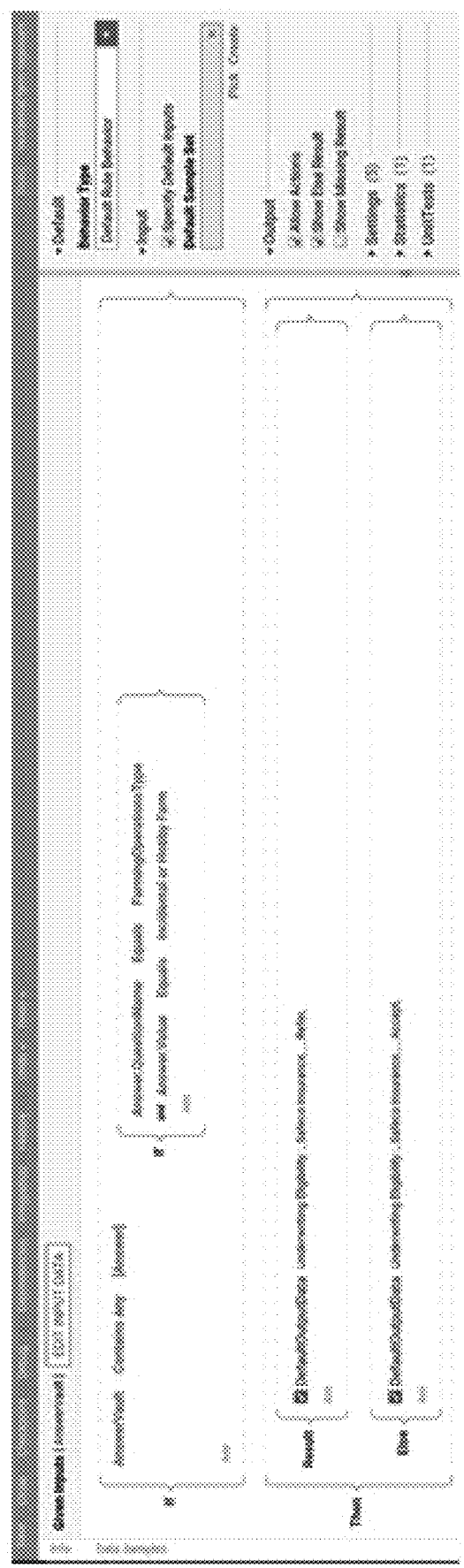
FIGS. 9 and 10 illustrate a user interface of the insurance interview designer that enables an insurance subject matter expert to configure the rules engine.
Figure 10:
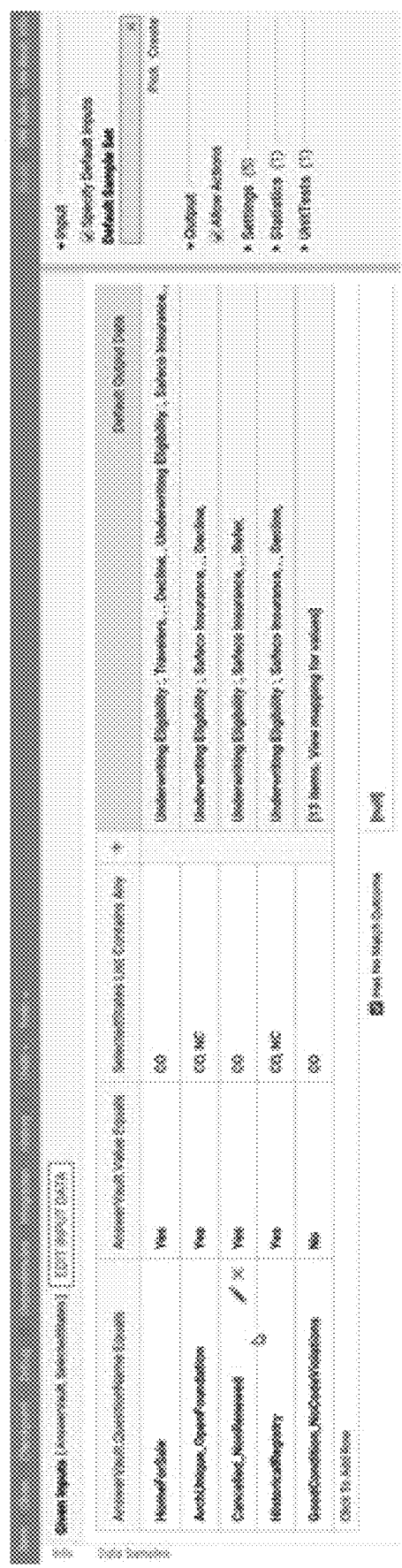

FIG. 8 illustrates a rules engine of the insurance interview designer according to an embodiment. FIGS. 9 and 10 illustrate a user interface of the insurance interview designer that enables an insurance subject matter expert to configure the rules engine.

Conventionally, an agent may be required to investigate the rules and policies necessary for an insurance application submission for each carrier. The rules engine of the insurance interview designer is configured to provide centralized functionality across multiple carriers, multiple states, multiple product lines, and multiple industries and classifications.

The rules engine may include visibility rules configured by the insurance subject matter expert that enable creation of interrelated, dependent questions. The dependencies may be determined based on answers to questions, regardless of the type of question. For example, in answering yes to a question, then an additional set of dependent questions may be provided. Additionally, the dependencies may include page dependencies, such that different insurance interview pages may be provided depending on an answer to a preceding question. Should questions to answers be sufficient to provide a determination that an application for an insurance product of a carrier would be declined, subsequent then questions specific to the carrier may be dynamically omitted. In an example, an agent may select to underwrite a *cannabis* dispensary in a geographic location. Specific questions for an application may be provided based on regulations and requirements within the geographic location. Similarly, specific questions related to *cannabis* within that geographic location may also be presented.

Additional rules configurable by the insurance subject matter expert via the rules engine may include submission rules. Each submission rule may enable an insurance agent to view insurance applications that are available and applicable for each insurance interview based on the characteristics of the desired insurance policy or product.

Submission rules may also display workflows or include workflows that will notify end users of any supporting documents that are required as part of the application submission process. Here, insurance carries or insurance underwriters may have subjectivities that are required in the application submission process. Because such information is accessible via the interview designer platform, application completion is more intuitive and streamlined.

The submission rules may also include rules regarding processes required for application submission. For example, information may be required to be submitted through an insurance carrier site or portal at particular timing periods.

Referring to FIG. 9, the rules engine may include underwriting rules. As an insurance agent works with a client desiring to purchase insurance, questions and possible answers to the questions may be presented via display. As the questions are answered, the underwriting rules may be leveraged to output results that indicate a likelihood of whether the insurance application will be accepted or rejected. If the insurance application might be rejected, then the underwriting rules may be leveraged to output additional recommendation results for alternative insurance markets. Thus, the coverage may not be offered for a current product line, but the coverage could be offered for a separate product line or under a separate condition.

Referring to FIG. 10, the underwriting rules may be associated, for example in a truth table, by carrier, product line, industry, location or state, and/or classification.

The rules engine may generate an interactive report of the underwriting results. Thereby, access to potential underwriting exposures may be provided interactively through the underwriting results document.

Figure 11:
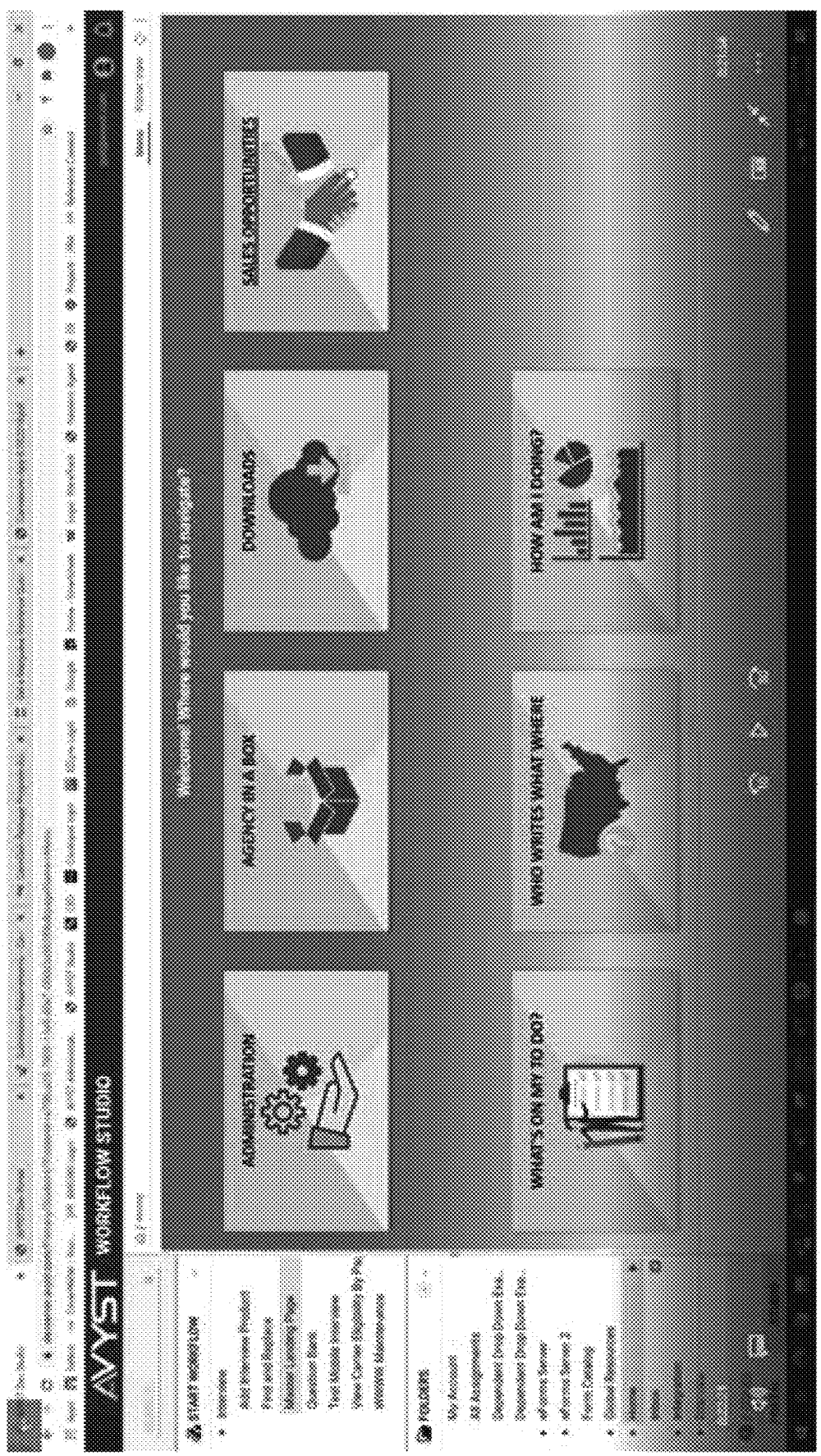
FIG. 11 illustrates a user interface for a developer accessing the insurance interview designer system according to an embodiment.

FIG. 11 illustrates a user interface for a developer accessing the insurance interview designer system according to an embodiment.

Referring to FIG. 11, access to the insurance interview designer system may be accomplished through interaction with a portal and the insurance interview designer portal may include a home screen through which agents perform the underwriting process. According to an embodiment, a panel may be included in the Master Landing Page for the Carrier Knowledge Exchange. Upon accessing the panel, insurance agents can make selections on the panel based upon targeted search parameters. A Carrier tile for carriers that fit the search criteria may be displayed, and through accessing the Carrier tile, the search results for that specific topic and carrier may be displayed. The categories that appear in the left hand search criteria column include inter-dependencies set by the subject matter expert. When the carrier information is updated, the updates will be recorded using a carrier interview, as described below. Updates may be recorded by effective date, and search results may be displayed based upon the current date. Notifications may be available for any revisions to insurance carrier policies that have a future effective date so that insurance agents can be aware of pending revisions. RPA, AI, and/or machine learning may be utilized to maintain carrier data.

According to an embodiment, the insurance interview designer system includes a "who writes what where" module through which a subject matter expert (not requiring programmer involvement) may create new product lines, industries, classifications, carriers, tenants for use in the system. This data is accessible via a standalone search engine, and may be sourced to dynamically present these options in a guided interview process.

The product lines may include personal product lines, commercial product lines, group benefits, life product lines, banking products and licensing products. The product lines are not limited to only the listed product lines, and the skilled artisan will understand that any of various product lines may be supported.

Similarly, classifications and industries may be created by a subject matter expert for use within the system.

An industry may possess a dependency of the classification, such as manufacturers or for-profit or nonprofit organizations, and sub-classifications within each industry may describe the type of association (e.g., non-profit, profit), or the type of facility (e.g., church, daycare). Access to such information may be provided to carriers through the portal, and thereby information may be updated by each carrier.

Insurance agents of insurance agencies accessing the platform may have the ability to access their associated information. For example, insurance agents may select the insurance products being offered to prospective customers.

The system includes personal lines and commercial lines of property casualty insurance. However, the system is completely scalable such that additional insurance products may be added, such as banking, group employee benefits, life insurance products (e.g., term, permanent annuity). Accordingly, an insurance agent utilizing the system may appropriately select either a personal or commercial category, states in which insurance sale is licensed and sold. Thereby, once carriers and states are selected, products may be viewed.

On the other hand, carriers accessing the system may indicate which insurance products are available in each state, and for each industry and classification. For example, carriers may select personal or commercial lines, and may be presented with the dependent product line for the states selected. Carriers may further select industries in which underwriting will occur, and different classifications within each industry. Accordingly, the system may easily scale to different types of insurance products and carriers, and the system may be continuously updated with accurate information.

According to an embodiment, the interview designer portal may include a user interface to referral partner access, through which insurance agents may partner with referral sources to receive qualified leads. The referral partner may be provided with a guest (or free) account to submit referrals for insurance products. Through the referral partner access, sales pipeline metrics by referral source may be tracked, and referrals may be accepted, suspended, declined and assigned by the receiving insurance agency. The referral partner access may enable documents to be uploaded for review by the insurance agent and the referral partner, and bi-lateral communication between the referral partner and the insurance agent may be logged. Via the referral partner access, notifications may be provided to both the referral partner and the insurance agent based on updates and timing deadlines with respect to insurance policy sales.

Referral partner access may additionally utilize sales data within the platform. Based on the sale data, match recommendations can be provided to connect potential agents with insurance carriers and/or wholesalers and vice versa. As a result, data driven recommendations may be provided for users within the insurance industry according to alignment in business types written by agents, wholesalers and insurance carriers.

According to an embodiment, the interview designer portal may further provide a user interface to case management. Via the case management interface, referral partners may input sales opportunities, and insurance agents may view, approve, and assign sales opportunities to insurance agents within the insurance agency. Through the case management interface, insurance agents may submit insurance applications and proposals to one or more market carriers, and market underwriters and carriers may be provided with access to the sales submission. Thereby, an underwriter or another insurance professional may update each submission status: whether accepted/issued, to identify premiums or fees, to update carrier name, limits, and deductibles, effective dates, additional forms for claims and occurrences, and exclusions, as well as to upload copies of insurance policies. Carriers may also indicate whether additional information is needed with respect to an insurance application submission, indicate a suspension of policies, and decline insurance submissions, with or without providing reasons for declination or recommendations for other carriers or markets.

Figure 12:
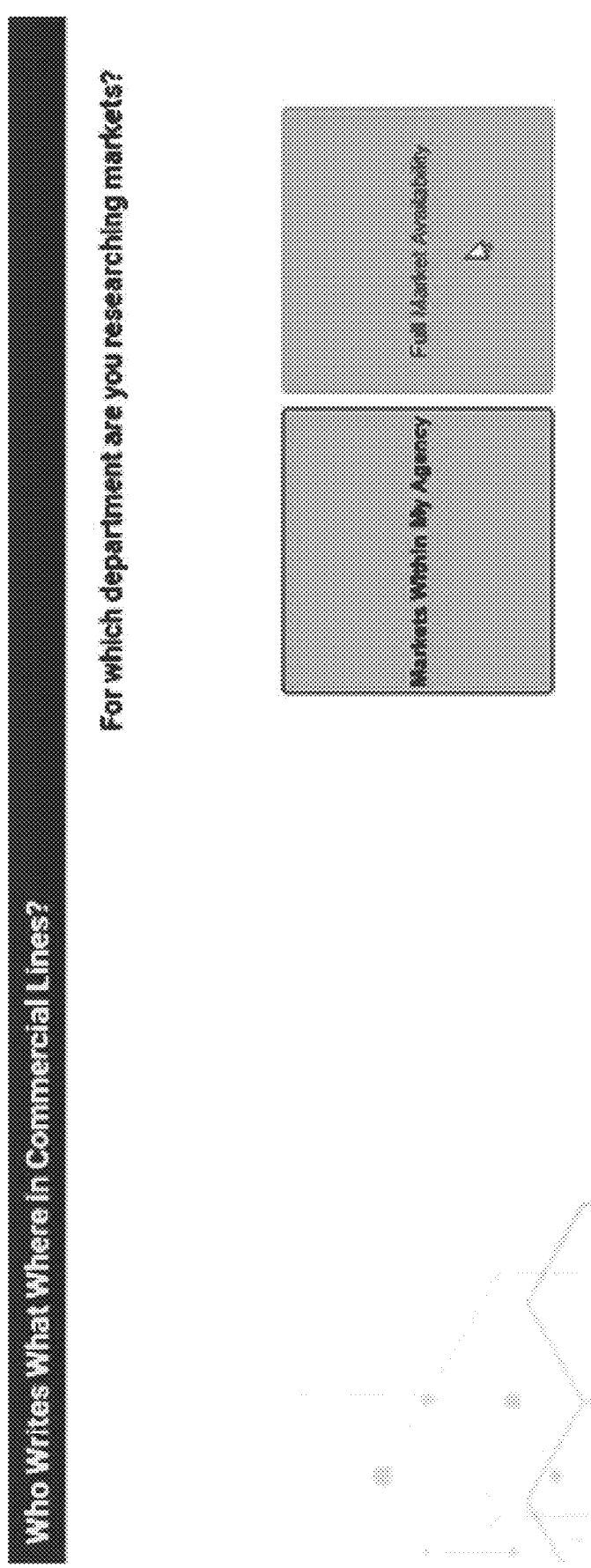
FIGS. 12, 13, and 14 illustrate searching for insurance products within the "who writes what where" module.
Figure 13:
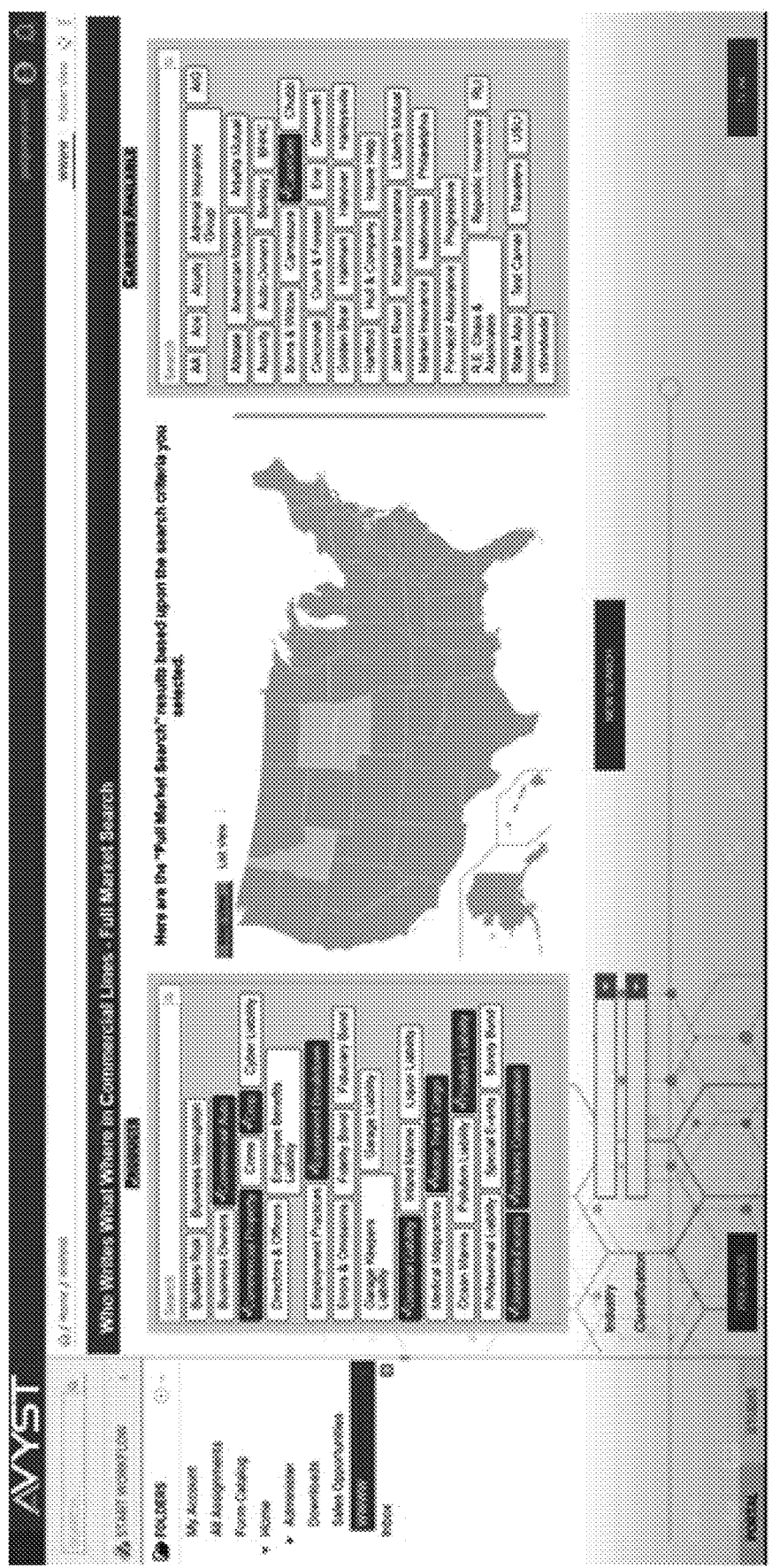
Figure 14:
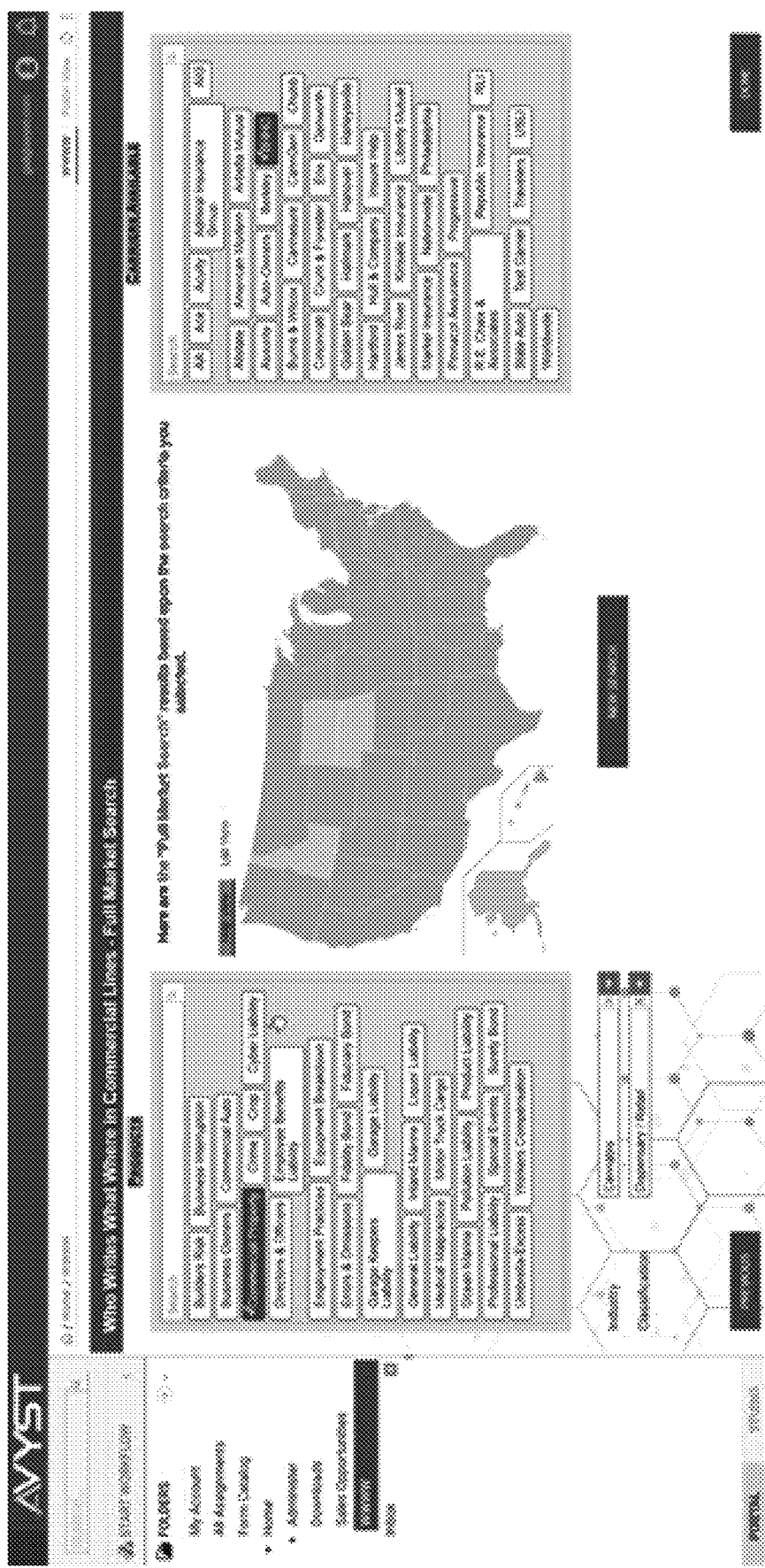

FIGS. 12, 13, and 14 illustrate searching for insurance products within the "who writes what where" module.

Referring to FIG. 12, an insurance agent may search for markets within their own agency or perform a full market availability search per carrier. According to an example embodiment, agents have visibility into markets and pricing of carriers that they are not currently appointed with and are not affiliated with based upon their Agency Onboarding Profile. The system can facilitate a potential appointment between agent and carrier based on the specified criteria for each carrier, if the carrier elects. Using the system, insurance agents are no longer required to either possess tribal knowledge necessary or spend time researching potential insurance markets to identify prospective insurance markets. The system dynamically presents potential markets in the interview user interface, automating the market research for insurance agents. The system may employ algorithmic data compiled and captured for markets included within the interview process search parameters. Thereby, insurance agency leadership may be presented with both data about their organization and industry wide, geographically categorized data. As a result, insurance agency leadership may be provided with insight into whether there is alignment with agency philosophy in regards to market inclusion and placement.

Independent Agents save tremendous amounts of time as they no longer have to research which applications are necessary for each state, carrier, product, industry and classification.

The interview designer aggregates questions from numerous insurance applications and synchronizes answers entered to "like" questions eliminating redundant entry for the insurance agent. Thereby, the interview designer system supports numerous insurance product lines integrated into a single insurance interview process.

Referring to FIGS. 13 and 14, alternatively, more targeted inquiries can be made according to one or more of carrier, type of insurance product offered, industry, and classification within the industry.

The insurance interview designer system may further include a documents module or component. Using the documents module, system administrators may import documents that reside in a document repository, and the imported documents can be accessed by agents through a search user interface. Upon search, the documents may also be presented within the interview system.

Through the insurance interview system, the documents may be accessible though one or more pages of the insurance interview. The documents thereby provide reference material relevant to one or more questions or answers provided on a page. For example, a document may illustrate a photo of a watercraft propulsion type (e.g., inboard, outboard, outdrive). As a result, an insurance agent may be provided with a visual representation to guide a prospective insurance customer through the various types of insurance options offered.

The documents may also include industry specific (ISO) documents, which may be policy forms that are often used in industry. Accordingly, additional reference material and forms are available for each product line.

The documents may also include additional industry specific documents (ACORD), which may be provided by a standard setting body in industry. These additional documents may be utilized for two different types of applications, which may either for personal or commercial lines, and then represented by state or by product line. These documents also include forms, which may include certificates of insurance, cancellation requests, or agents of record documents.

Last, the documents may include carrier documents. The carrier documents may be stored according to carrier, product, state, industry, and classification. Each document may also be associated with effective dates.

The carrier documents may also include product comparison sheets, policy forms, applications, and source documents. The source documents may include underwriting rules, submission rules, and market appetite documents. Thereby, the system may present multiple carrier results for underwriting by referencing the various carrier documents. Additionally, owing to the retention of the carrier documents, information may be provided in the case of audit for the basis of rule generation, question generation, and answer generation. Should new versions of any of the carrier documents be discovered, then the system may automatically generate workflow to maintain the current status of information within the system. Thereby, the insurance interview designer system provides a robust system for completing insurance applications.

As described above, the insurance interview designer algorithmically builds the insurance interview based upon answers by the prospective insurance purchaser to questions posited by the interview system. The system thereby supports numerous product lines in a single insurance interview. Users may attach supporting documents to the interview file, which can be included in the submission packet to the wholesale market or insurance carrier. Conversational and educational information is presented throughout the interview process to ensure an accurate result for the prospective purchaser. Users may also create flags and enter comments at the question level throughout the insurance product to more finely customize the interview process. Additionally, informational documents may be presented for the users' benefit throughout the interview process. Thus, the interview process supports multiple conversation paths, including prospecting, interview, and closing scripts. Moreover, the system supports the ability to transition each sales opportunity as the sales cycle progresses between: referral partners, client facing (independent agent can enable a client to access the interview system), independent agents, and wholesalers.

Once the insurance interview process has been completed, the user may be presented with algorithmic workflows for each potential insurance market based upon each market's submission requirements. All necessary applications are compiled based upon the state, carrier, product line, industry and classification, etc. Applications are completed utilizing answers to questions within the insurance interview, and interview responses are sent electronically to those markets that provide the capability to receive the information through an application program interface (API) or other format, in which submission workflows are inclusive of subjectivity requirements based upon each market: financials, resumes, MVR(s), loss runs, and license copies, etc.

In an embodiment, the insurance interview designer may present the user with the option to purchase one or more insurance products, for example through display of a "Buy Button" on a user interface. With the completion of an interview, based upon its risk profile such as classification and product lines, the end-user can submit requests for quoting for certain prospects to multiple insurance carriers and be offered quote/bind/issue capability through a binding authority facility, if applicable. The system may trigger necessary reports to be accessed and enable report data to be populated into the interview results. This enables the end-user to complete the "issuance" process of the insurance policy utilizing automation without the need to bridge to the insurance carrier website, or submit an application by email.

According to an embodiment, the insurance interview designer system may be adapted to questions about carrier data. During the interview, answers are provided to questions that prospective agents may posit during the new business or renewal submission process. Accordingly, such questions may be posed to insurance carriers in the interview format. Questions to carriers may include pricing models offered by the insurance carriers, options offered for various types of insurance policies, and other detailed about insurance products that may be offered by insurance carriers.

The answers to questions provided by the insurance carriers may then be populated into data structures available in a searchable format. As a result, insurance agents may perform targeted searches for information on any number of insurance topics and obtain collective results or results filtered according to each insurance carrier including monoline package availability, billing and payment details, binding authority coverage availability, deductible availability, total insurable value (TIV) limitations, and submission requirements, which may include a list of applications required, loss run requirements, X-mod worksheet requirements, copies of licenses and permits, MVRs, business income worksheets, and carrier information, including contact ratings, admitted and non-admitted details, and minimum premiums.

Through the carrier integration, insurance agents can avoid disparate communication via email or updates posted on insurance carrier websites, as each insurance carrier may communicate differently. Thus, the interview designer system and portal provide a centralized notification center through which insurance agents may access notifications from any insurance carriers that are participating members and with which agencies have appointments and contracts. Accordingly, centralized access to insurance carrier notifications may be categorized by carrier, product, state, industry, classification, department, topic, etc.

According to an embodiment, the insurance interview designer system may be integrated with a workflow system, such that agency workflows are automated and researching workflows in which RPA can be utilized. For example, in a human resources workflow, a new employee may be tracked by workflow system. Via the workflow system, employee information may be entered during tenant onboarding. Of course, information regarding existing insurance agents of an insurance agency may also be input. In a hiring workflow, a job posting may be integrated through tine interview designer system, which may include a job description, a department, a position, a job posting method, application and resume requirements, salary information, benefits information, and interview process details including scheduling, interview notes, interview questions by position, a decision process, and an offer process. Automation of these workflows utilizing the workflow component, the rules engine component, AI, machine learning and RPA may be referred to the umbrella term "Agency in a Box."

According to an embodiment, the human resources workflow may include employee management workflows and logistics related to employee orientation, an automated appointment process with all carriers, and employee resource procurement including business cards, office keys and key cards, laptops, headsets, monitors, cell phones, etc. Additional employee management workflows may include salary review, job description modification, performance review, disciplinary matters, position changes, employee manual modifications, and termination, including documentation, workflow reassignment, and property return.

Other workflows integrated within the interview designer system may include new carrier appointments, new carrier workflows, invoicing, commissions, personal lines claims, commercial lines claims, personal lines agent of record, commercial lines broker of record, personal lines for new business, commercial lines for new business, multi-lines endorsements, commercial lines endorsements, personal lines renewals, and commercial lines renewals including manual renewal and automatic renewal, and commercial lines policy checking.

According to an embodiment, other integrations with the interview designer system may include property data, ISO data including class codes and protection classes, vendor ratings, carrier ratings and pricing data integration, carrier integration, management system integration, flood zones, $3^{rd}$ party vendor verification of insured data, electronic signatures, outside finance vendors, replacement cost calculator, property information (COPE), electronic signature, outside finance vendors, payment processing, phone recording systems, MGAs, etc.

Other features integrated with the interview designer system may include gamification and scoring, in which KPIs may be selected by each insurance agency based upon priority metrics and scores are calculated based upon reaching those KPIs. Thereby, insurance agents may participate in gamification that tracts, reports and, rewards individual results. Each insurance agency may configure how scores and results are shared within their organization, and may implement a rewards system. Accordingly, sales pipelines may be effectively tracked to include insight into client acquisition cost metrics and tracking of a "previous" carrier to a "placed" carrier. Other metrics may include aggregated data according to coverage types and geographical territories. Close ratios may be determined per referral source, per staff member, per department, per location, and per product line. As a result, various reports may be generated based on data including the number of product lines per account, the sales pipeline categories, referrals (received, suspended, declined, accepted, assigned), interviews (scheduled, processed, completed), quoting (not submitted, pending, complete), results (loss per product line, per carrier, per loss type, expiration date, per success type), and suspensions of insurance products and premiums (customer interest, delay, date of follow-up), length of time in per category, and number of items in each category. Alternatively, reports may be provided on a dashboard, customizable by the insurance agency.

Still other features integrated with the interview designer system may include internationalization of an interview in additional languages, voice recognition including voice to text and text to voice, and augmented reality insurance industry training. Such augmented reality training may utilize augmented reality to provide training for insurance agents using augmented reality hardware. In an example, such training may provide a simulated experience of entering a restaurant and discussing the topic of the types of property categorized as "Building" or "Business Personal Property," to visually modify the building. If the property is not attached to the building and falls, then the training indicates a "Business Personal Property." All remaining items may be categorized as "Building" items. As the agent walks through the restaurants, exposures and coverages may be presented and experienced. In an alternative reality, an insurance agent will experience driving a semi-truck. As the agent drives, exposures and coverages are presented and experienced.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An apparatus for generating an application document, the apparatus comprising:
    a memory storing one or more instructions; and
    a processor configured to execute the one or more instructions to:
        retrieve a plurality of candidate questions from at least one database, each of the plurality of candidate questions corresponding to one of a plurality of entities, and each of the plurality of entities being different from each other;
        remove substantively similar candidate questions among the plurality of candidate questions from the different entities; and
        generate a graphical user interface by aggregating remaining candidate questions among the plurality of candidate questions after the removal of the substantively similar candidate questions as application questions;
    wherein the generating the graphical user interface comprises:
        configuring a plurality of pages based on the application questions,
        generating and displaying a first page, among the plurality of pages, corresponding to a first subset of questions among the application questions,
        receiving answers to the first subset of questions,
        dynamically updating the graphical user interface based on the first subset of questions; and
        generate a completed application document for a first entity selected one of the entities from among the different entities based on the answers to the first subset of questions.

2. The apparatus of claim 1, wherein the dynamically updating the graphical user interface based on the one or more subsets of questions comprises generating and displaying a second page, among the plurality of pages, corresponding to a second subset of questions among the application questions.

3. The apparatus of claim 2, wherein the second subset of questions is determined based on the answers to the first subset of questions and based on the selected first entity.

4. The apparatus of claim 1, wherein the generating and displaying a first page comprises providing one or more related documents related to the first subset of questions.

5. The apparatus of claim 1, wherein each of the plurality of entities is an insurance carrier.

6. The apparatus of claim 1, wherein the dynamically updating the graphical user interface based on the one or more subsets of questions comprises refraining from presenting additional questions based on a determination that the answers to the first subset of questions does not satisfy a criterion of the entity.

7. The apparatus of claim 1, wherein the dynamically updating the graphical user interface based on the one or more subsets of questions comprises presenting candidate answer lists corresponding to the different entities for selection.

8. A system for aggregating insurance carrier application data, the system comprising:
    at least one database, the at least one database storing a plurality of insurance interview questions, the plurality of insurance interview questions comprising insurance application questions aggregated from substantively similar insurance application questions of different insurance carriers; and
    a processor configured to control display of a plurality of pages comprising subsets of insurance application questions from among the plurality of insurance applications questions, receipt of answers to the subsets of insurance carrier questions via a user interface, and output of a completed insurance application for a selected insurance carrier from among the different insurance carriers.

9. A system for aggregating insurance carrier application data, the system comprising:
    at least one database; and
    a processor configured to control display of at least one user interface configured to aggregate a plurality of substantively similar insurance application questions of different insurance carriers as a set of insurance application questions stored in the at least one database, configure a plurality of pages of an insurance application interview comprising subsets of insurance application questions from among set of insurance application questions and receipt of answers to the subsets of insurance application questions, and generate a completed insurance application for a selected insurance carrier from among the different insurance carriers based on the answers to the subsets of insurance questions.

\* \* \* \* \*

UNITED STATES PATENT AND TRADEMARK OFFICE
CERTIFICATE OF CORRECTION

| | |
|---|---|
| PATENT NO. | : 11,694,275 B2 |
| APPLICATION NO. | : 17/559603 |
| DATED | : July 4, 2023 |
| INVENTOR(S) | : Gail Jordan, Keith Savino and Marc Still |

It is certified that error appears in the above-identified patent and that said Letters Patent is hereby corrected as shown below:

On the Title Page

Item (72) Inventors, Second Inventor; Please delete "Keith Saving" and replace with
-- Keith Savino --

Signed and Sealed this
First Day of August, 2023

Katherine Kelly Vidal
*Director of the United States Patent and Trademark Office*